(12) United States Patent
Frowein et al.

(10) Patent No.: US 6,665,820 B1
(45) Date of Patent: Dec. 16, 2003

(54) METHOD AND SYSTEM FOR COMMUNICATIONS CONNECTIVITY FAILURE DIAGNOSIS

(75) Inventors: Richard L. Frowein, Waukesha, WI (US); George Peter Gesior, Waukesha, WI (US); Joel Janz, Hartford, WI (US); Lew Krisberg, Waukesha, WI (US); Don Thome, West Allis, WI (US); Sarah Hertel, Brookfield, WI (US); Todd Reinke, Hartland, WI (US)

(73) Assignee: GE Medical Technology Services, Inc., Pewaukee, WI (US)

( * ) Notice: Subject to any disclaimer, the term of this patent is extended or adjusted under 35 U.S.C. 154(b) by 0 days.

(21) Appl. No.: 09/470,478

(22) Filed: Dec. 22, 1999

(51) Int. Cl.⁷ .................................................. G06F 11/00
(52) U.S. Cl. ............................................. 714/43; 714/4
(58) Field of Search ............................... 714/43, 4, 27; 709/227, 228, 229; 379/33, 100.05

(56) References Cited

U.S. PATENT DOCUMENTS

| | | | |
|---|---|---|---|
| 5,490,271 A | * 2/1996 | Elliott et al. | 709/202 |
| 5,640,505 A | * 6/1997 | Hearn et al. | 379/114.01 |
| 5,652,908 A | * 7/1997 | Douglas et al. | 709/220 |
| 5,655,068 A | * 8/1997 | Opoczynski | 714/4 |
| 5,819,019 A | * 10/1998 | Nelson | 709/226 |
| 5,828,728 A | * 10/1998 | Hoy et al. | 379/21 |
| 5,909,480 A | * 6/1999 | Reynaud et al. | 379/15.01 |
| 6,041,356 A | * 3/2000 | Mohammed | 370/389 |
| 6,141,777 A | * 10/2000 | Cutrell et al. | 379/1.01 |
| 6,148,339 A | * 11/2000 | Nagamatsu et al. | 709/202 |
| 6,199,172 B1 | * 3/2001 | Dube et al. | 714/11 |
| 6,330,597 B2 | * 12/2001 | Collin et al. | 709/201 |

OTHER PUBLICATIONS

United States Patent Application Publication, Pub. No.:US2001/0054161 A1, Pub. Date: Dec.20, 2001, Filing date:Jul. 15, 1998.*

* cited by examiner

Primary Examiner—Robert Beausoliel
Assistant Examiner—Christopher S. McCarthy
(74) Attorney, Agent, or Firm—Zilkowski Patent Solutions Group, LLC; Michael A. Della Penna; Carl B. Horton

(57) ABSTRACT

A system and method is disclosed for communications connectivity failure diagnosis that includes receiving a connectivity failure notice at an on-line center indicative of a communications failure between the on-line center and an in-field product, such as a medical diagnostic device. A software-based non-connect test is manually initiated to confirm a communications failure between the on-line center and the in-field product. Once the communications failure is confirmed, the communications failure is diagnosed by isolating the communications failure through use of the non-connect test and identifying a failure type which indicates what portion of the system failed. The method includes reporting the communications failure for repair, and once repaired, the system conducts a series of tests to confirm proper connectivity and logs the results therefrom. Optionally, the system includes an entitlement check which automatically ensures that a particular customer, or in-field product, is entitled, or under contract, for the diagnostic service. Also, if the fault is not found timely, there are provisions in which the service is escalated to increased levels of support to ensure customer satisfaction.

25 Claims, 7 Drawing Sheets

METHOD AND SYSTEM FOR COMMUNICATIONS CONNECTIVITY FAILURE DIAGNOSIS

BACKGROUND OF THE INVENTION

The present invention relates generally to communications connectivity servicing for in-field products or equipment, and more particularly to, a method and apparatus for communications connectivity failure diagnosis between a centralized online service center and remote subscribing stations having in-field equipment, such as medical diagnostic equipment.

Medical diagnostic equipment and supporting systems, such as medical imaging systems, have become increasing complex in recent years. Examples of such systems include magnetic resonance imaging (MRI) systems, computed tomography (CT) systems, ultrasound and x-ray systems, and positron emission tomography (PET) systems. To add to the complexity of each particular imaging system, many facilities today incorporate a variety of such equipment. In larger facilities, the systems may be networked to permit common management and control. Further, such systems may be networked with a picture archiving and communication system (PACS) for storing digitized image data for subsequent retrieval and reconstruction. Additionally, teleradiology systems involve transmitting digitized image data to remote locations for review and diagnosis by specialized physicians and/or radiologists.

Because medical diagnostic systems are critical elements in the diagnosis and treatment of patients, their use must not be inhibited by a slow response for service or maintenance. Due to the increasing-complexity of these systems, service personnel with appropriate training are oftentimes not on location with the equipment. Therefore, remote servicing of medical diagnostic equipment has become an important tool in maintaining these systems.

Remote servicing of medical diagnostic equipment has traditionally been performed via voice communication between operations personnel and a centralized servicing facility. Operations personnel would call a remote service facility to report malfunctions and ask questions to correct such malfunctions. When such queries could not be sufficiently handled by telephone, a service or field engineer was dispatched to troubleshoot the system and provide the needed assistance. Communications connectivity problems are especially difficult to troubleshoot because contact with the on-line center is now limited to voice communication. Also, if the distance between the medical diagnostic equipment and the centralized on-line service center is great, the service personnel can be sent out to one location when the problem actually exists at the other. Further, a communications connectivity failure can occur without a customer even knowing it has occurred because such equipment is operational without having to connect to the on-line center. However, once on-line servicing is needed, a communications failure can become a critical failure needing immediate attention.

Recently, systems have been developed to automatically and periodically check for proper connectivity. However, it is one thing to notice a communications problem and quite another to diagnose the fault. Once such a notification is made, a different process is needed to efficiently diagnosis and repair the problem in a timely manner. The importance of proper connectivity and the importance of quickly addressing a failure once one is detected, will be readily ascertained from the following description of the current state-of-the-art of such systems.

Improvements in computer networks have greatly facilitated the task of offering assistance to medical imaging equipment. In particular, rather than having to call a service center and talk to a technician or engineer, or to await a return call from the service center, network technologies have facilitated proactive techniques wherein the service center may contact the medical diagnostic equipment to check the status of subscribing equipment. Further advancements have been proposed to provide remote service to medical diagnostic systems in an effort to provide the level of service on a continual and interactive basis as needed by many facilities. In one such system, a service center can interactively receive messages via a network and can respond automatically to the messages if configured correctly. Data required to analyze the state of operation of the medical diagnostic equipment can be transferred during an electronic connection. This technique greatly facilitates identification of system problems, allows questions to be posed to the subscribing service provider, facilitates transfer of updates and imaging protocols, and permits standard and customized reports to be transmitted to subscribing systems or stations. The interactive aspect of this technique allows the medical diagnostic facility to remain current on services provided by the centralized service facility and to readily communicate with the centralized service facility.

While such advancements in the provision of remote services to medical diagnostic equipment has greatly enhanced the level of service and information exchange, they are subject to unanticipated connectivity problems. In order to perform connectivity diagnosis manually on each particular portion of a communications system is slow and labor intensive.

The goal of the present invention is to identify connectivity problems quickly at the on-line center and ensure the connectivity is properly corrected, while logging diagnostic and repair data so that the centralized facility can contact the subscribing station at will, and conversely, so that the subscribing station can freely contact the centralized service facility and each can exchange data accurately.

It would therefore be desirable to have a system and technique for communications connectivity diagnosis capable of receiving a connectivity failure notice at an on-line center indicating a communications failure, allowing a manual initiation of a software-based non-connect test to confirm communications failure, and quickly diagnosing the communications failure by isolating the communications failure and reporting the failure for repair, and once repaired, ensuring proper connectivity with redundant connectivity testing. It would also be advantageous to have a system that could automatically check whether a particular customer is entitled to such value-added service, and if not, then keeping a log of such connectivity failures so that the customer can be alerted as to not only the number and times of the failures, but of the value-added service available for connectivity failure diagnosis. It would also be advantageous to have a system that can automatically check the status of a case so that the customers are provided successful diagnostics within a given period of time, by escalating to a higher level of service if standard service does not resolve the failure.

SUMMARY OF THE INVENTION

The present invention provides a system and method to confirm a communications connectivity failure between an on-line center and a subscribing station having in-field product and diagnose the cause of the failure, and once repaired, ensuring proper connectivity that overcomes the aforementioned problems.

The present invention includes a technique that includes both hardware and software by which an on-line center, at a centralized facility, is capable of diagnosing a connectivity failure. The technique includes an initial notification of a problem, a preemptive check to see if the customer is entitled to diagnostics and repair, and diagnostics to resolve the problem. If the customer is not entitled, the system does not perform the diagnostic and repair service. If the customer is so entitled, the system checks the age or status of the complaint, and if the status of the case becomes older than some predetermined time, the service diagnostics are escalated to ensure proper customer satisfaction. Once the problem is isolated and diagnosed, the repairs are made, and the method and system validates that proper connectivity is again achieved. The technique records all failure notices and keeps a record of the diagnostics and the repairs undertaken.

In accordance with the process of the present invention, a method of communications connectivity failure diagnosis is disclosed that includes receiving a connectivity failure notice at an on-line center indicative of a communications failure between the on-line center and an in-field product. The method includes manually initiating a software-based non-connect test to confirm communications failure between the on-line center and the in-field product and diagnosing the communications failure by isolating the communications failure and identifying the type of failure. The communications failure is reported for repair, and once repaired, proper connectivity is confirmed by multiple dial-up tests between the on-line center and the in-field product.

In accordance with another aspect of the invention, a communications connectivity failure diagnosis system includes a subscribing station having at least one in-field product and at least one computer programmed to control the in-field product. An on-line center is capable of receiving a connectivity failure notice indicative of a communications failure between the on-line center and the subscribing station and creates a database case in response therefrom. The system includes a communications network to relay data from the on-line center to the subscribing station. The communications network includes a communications portion in the on-line center and a communications portion in the subscribing station. The communications network also includes an ability to connect the on-line center to the subscribing station through an external communications network. The system allows a service person at the on-line center to initiate a non-connect test in response to the on-line center receiving a connectivity failure notice. Based on the results of the non-connect test, the on-line center automatically isolates the communications failure to the on-line center, the subscribing station, or the external communications network. In many cases, the external communications network may include a public communications utility, in which case, the invention does not include that external communications network, but only includes the ability to connect to that network and isolate the problem to that network, if that is where the problem lies. In other cases, the external communications network may include a dedicated line between the subscribing station and the on-line center, an intranet, or other closed, proprietary system.

In accordance with yet another aspect of the invention, a computer program stored on a computer-readable storage medium is disclosed which, when executed by one or more computers, will cause the one or more computers to create and queue a reported case for communications connectivity diagnosis and receive input to initiate a non-connect test. The non-connect test is executed to validate a communications failure and report the problem for repair. Once repaired, the non-connect test includes causing communications connectivity and validating whether communications connectivity is successful. If it is not, the communications failure is isolated and the isolated communications failure is again reported for repair. The non-connect test is again executed after receiving input that the repair has been complete to ensure proper communications connectivity. Once communications connectivity is successful, the results are logged to complete the communications connectivity diagnosis.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
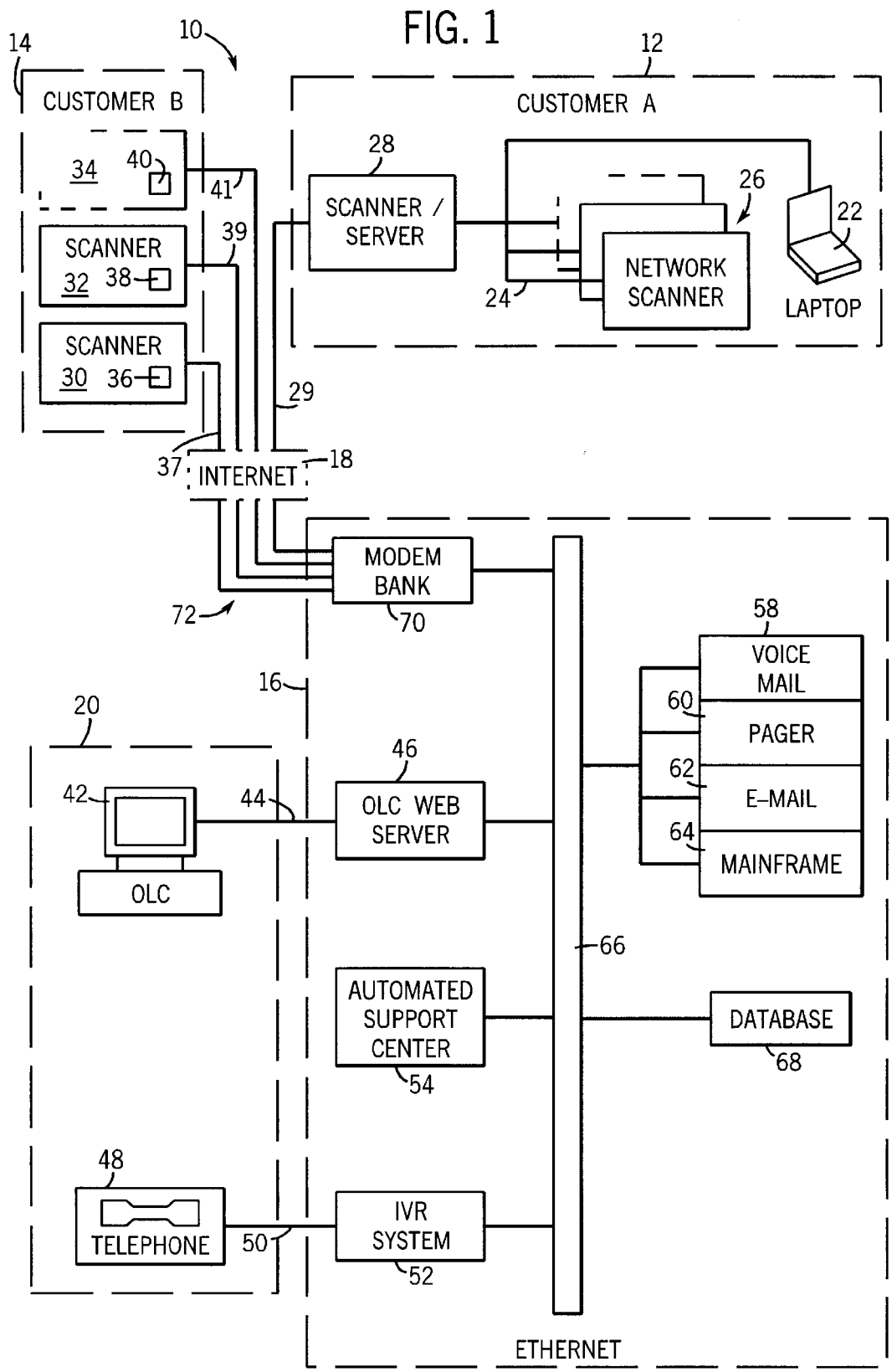
FIG. 1 is a block diagram of a system for which the present invention is implemented therein.

Referring to FIG. 1, an overview block diagram of a medical diagnostic and service networked system 10 is shown which includes a plurality of subscribing stations, such as Customer A referenced with numeral 12, and Customer B referenced with numeral 14. It is understood, that the number of subscribing stations can be limitless, but two specific embodiments are shown with Customer A and Customer B, which will be further explained hereinafter. The subscribing stations 12, 14, are connected to an on-line center 16 through a communications link, such as a network of interconnected server nodes 18 or a remote link 20. Although a single on-line center is shown and described, it is understood that the present invention contemplates the use of multiple on-line centers, each capable of communication with each subscribing station. Each subscribing station has operational software associated therewith which can be configured, serviced, maintained, upgraded, or simply monitored by the on-line center 16.

The various systems disclosed are configured to be selectively linked to the on-line center 16 by either the remote link 20, or in the example of subscribing station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of in-field products. A subscribing station may include a variety of medical diagnostic systems of various modalities. As an example, in the present embodiment, the in-field products may include a number of networked medical image scanners 26 connected to an internal network 24 served by a single scanner 28 having a work station configured to also act as a server, or configured as a stand-alone server without a medical image scanner associated therewith. Alternately, a subscribing station, or customer site 14 can include a number of non-networked medical image scanners, 30, 32, 34, each having a computer or work station associated therewith and having an internal modem 36, 38, 40 to connect the subscribing station to a communications link, such as the Internet 18 through links 37, 39, and 41, respectively, to communicate with the on-line center 16. Internet 18 is shown in phantom to indicate that an external communications network can include Internet 18, together with communication links 29, 37, 39 and 41, or alternatively, can include direct dial-up links through dedicated lines, an intranet, or public communications systems.

It is understood that each of the network scanners 26 has its own workstation for individual operation and are linked together by the internal network 24 so that the customer can have a centralized management system for each of the scanners. Further, such a system is provided with communications components allowing it to send and receive data over a communications link 29. Similarly, for the non-networked medical image scanners at subscribing station 14, each of the scanners 30, 32, 34 have individual communications links 37, 39, 41. Although FIG. 1 shows each of these links connected through an open network 18, it is understood that these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, as well as positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses. In the embodiment shown in FIG. 1, each customer subscribing station 12, 14 can include any combination of the aforementioned systems, or a subscribing station may have all of one type of a system. A customer subscribing station can also include a single medical image scanner. Mobile diagnostic systems can be configured similarly to that of subscribing station 12 or subscribing station 14. Such mobile diagnostic systems can include equipment of various modalities, such as MRI, CT, ultrasound, or x-ray systems and are mobilized in order to better service various medical facilities and patients.

The communication connectivity failure diagnosis process and system of the present invention can be initiated by authorized personnel, such as an on-line engineer or technician, administrative personnel, and/or other such similar authorized personnel, from a computer or workstation 42 in the remote link 20, which can be a part of the on-line center 16, or be separately connected to the on-line center 16 by a dialup link 44 to a web server 46 in the on-line center 16. Alternatively, it is contemplated that the system could be initialized by a laptop computer 22 connected to a customer internal network 24, or individually connected to each of the scanners 30, 32, or 34. The remote link 20 also can serve to connect the on-line center 16 to a subscribing station by a telephone and telephone connection 48 through a conventional telephone network 50 and to an interactive voice recognition system (IVR) 52 in the on-line center 16. The on-line center 16 includes a number of processing systems including computers for the IVR system 52, an automated support center 54, and the web server 46. Other processor systems include computers to maintain a voicemail system 58, a pager system 60, an email system 62, and a main frame 64, and more generally, an output report generator and notifier. Each is connectable and can transmit data through a network, such as an ethernet 66 with one another, or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touch-tone telephone 48. A bank of modems 70 is connected to the ethernet 66 to relay data from the on-line center 16 and to the subscribing stations 12, 14 through a plurality of modem links 72.

As previously discussed, each of the systems and substations described herein and referenced in FIG. 1 may be linked selectively to the on-line center 16 via a network 18. According to the present invention, any acceptable network may be employed whether open, dedicated, virtual private, or so forth. The communications links to the network may be of any acceptable type, including conventional telephone lines, cable modem links, digital subscriber lines, and the like. Each of the systems is provided with communications interface hardware and software of generally known design, permitting them to establish network links and exchange data with the on-line center 16. The systems are provided with interactive software so as to configure the systems and exchange data between the subscribing stations and the on-line center 16. In some cases, during periods when no data is exchanged between the subscribing station and the on-line center, the network connection can be terminated. In other cases, the network connection is maintained continuously.

The present invention includes a method and system for diagnosing communications connectivity failures between the on-line center 16 and subscribing stations such as, 12, 14. Such communications failures can occur within the on-line center 16, and most commonly in the modem bank 70, the ethernet 66, or connections therebetween. A communications failure can also occur at the subscribing stations, such as in a customer internal network 24, the individual networked scanners 26, the server 28, individual modems 36, 38, 40, or the non-networked scanners 30, 32, or 34. Additionally, a communications failure can occur in an external communications network, including the communications links 29, 37, 39, 41, 72, and/or the Internet 18 or public communications system. As previously set forth, it is understood that the external communications links can include a closed intranet system or an open public communications system.

Figure 2:
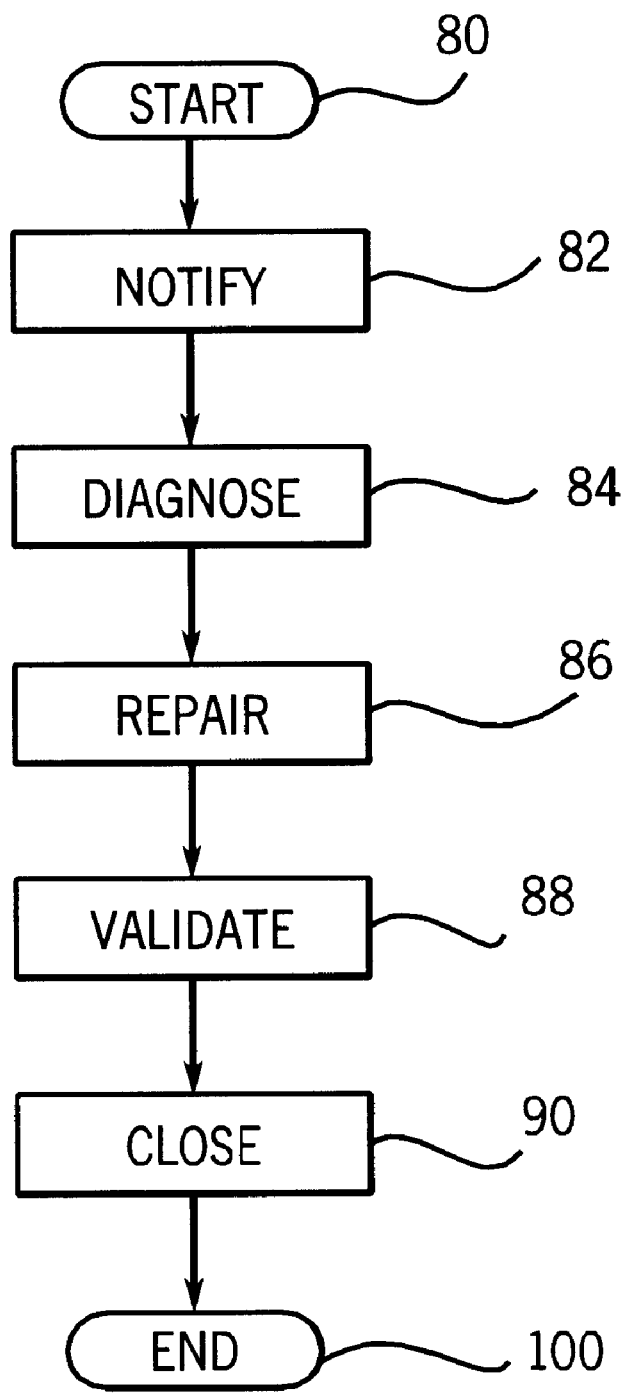
FIG. 2 is a high-level flow chart providing an overview of the present invention.

Referring to FIG. 2, an overview of the system is first provided with a high-level flow chart. The communications connectivity failure diagnosis process is initiated 80 with a first notification step 82, that preferably, includes the ability to receive both manual notifications and automated notifications to the on-line center. The next high-level step is a problem diagnosis 84 in which it is ensured that the customer is entitled to such diagnostics and wherein the diagnosis of the communications failure takes place. The failure is then repaired 86 and communications connectivity is validated at 88. The present invention includes a reporting and logging process before closing the case at 90, which then concludes the process 100.

Figure 3:
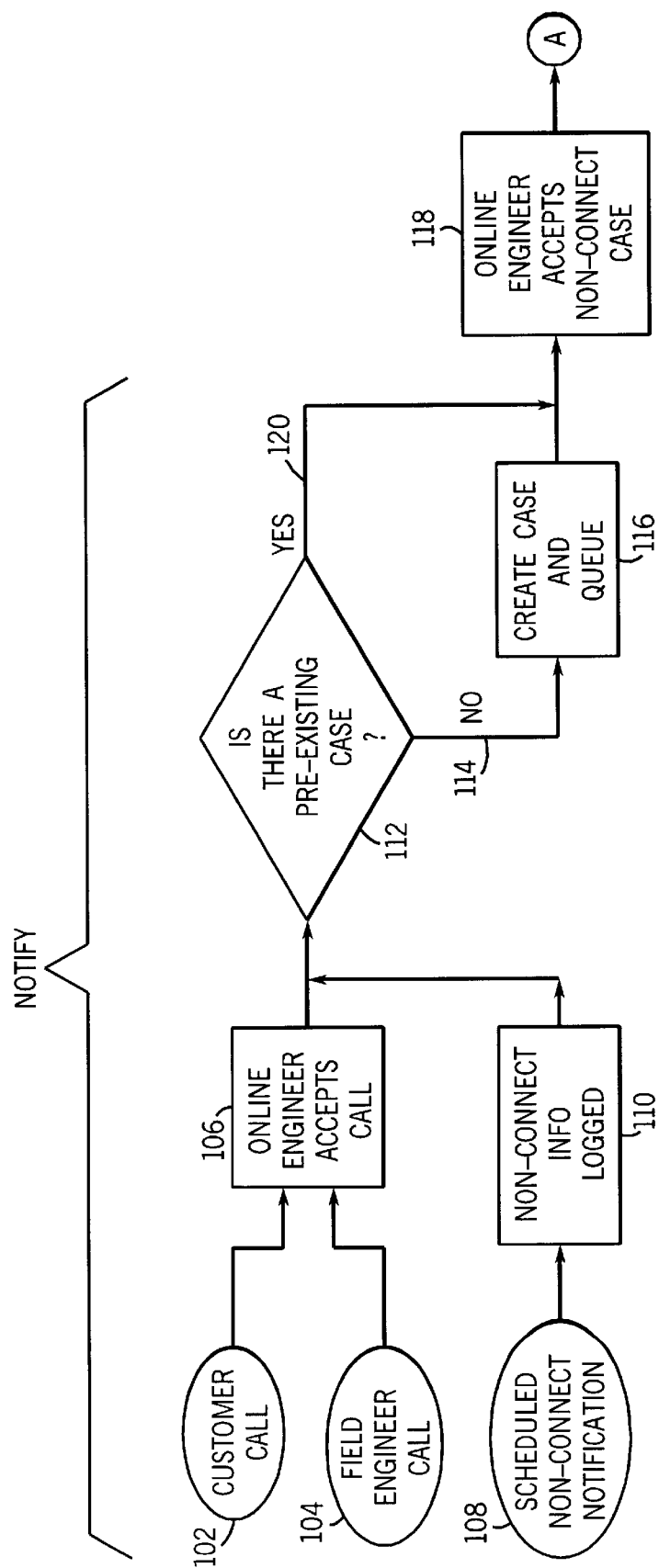
FIGS. 3 and 4 are detailed flow charts of the system shown in FIG. 2.

FIG. 3 shows details of the notification process outlined in FIG. 2. After initialization 80, notification 82 is provided by either a call from the customer 102 or a call from a field engineer 104. Typically the call will originate at one of the subscribing stations and is received by an on-line engineer 106 at the on-line center. Such notification is generically referred to as a non-computerized connectivity failure notice, and that indication of a communications failure is then input to the computerized system in the on-line center by the on-line engineer at 106. Alternatively, a communications failure may also be provided by a computerized automatic connectivity failure notice 108 which is then logged in a database 110. The computerized automatic connectivity failure notice can be provided by a scheduled automated non-connect test which is conducted periodically between the on-line center and each subscribing station by a computer in the on-line center 16 of FIG. 1. Once the on-line engineer enters the communications failure notification into the computer 106, FIG. 2, or the data is logged automatically 110, the system checks to see if a database case has already been opened 112, and if it has not 114, a case is opened and set in a queue 116 until an on-line engineer is available to begin diagnosis 118. If there is a pre-existing case 112, 120, the notification may have come from multiple sources or called in twice, and in that case, is already in queue for an on-line engineer to begin diagnosis at 118.

Figure 4:
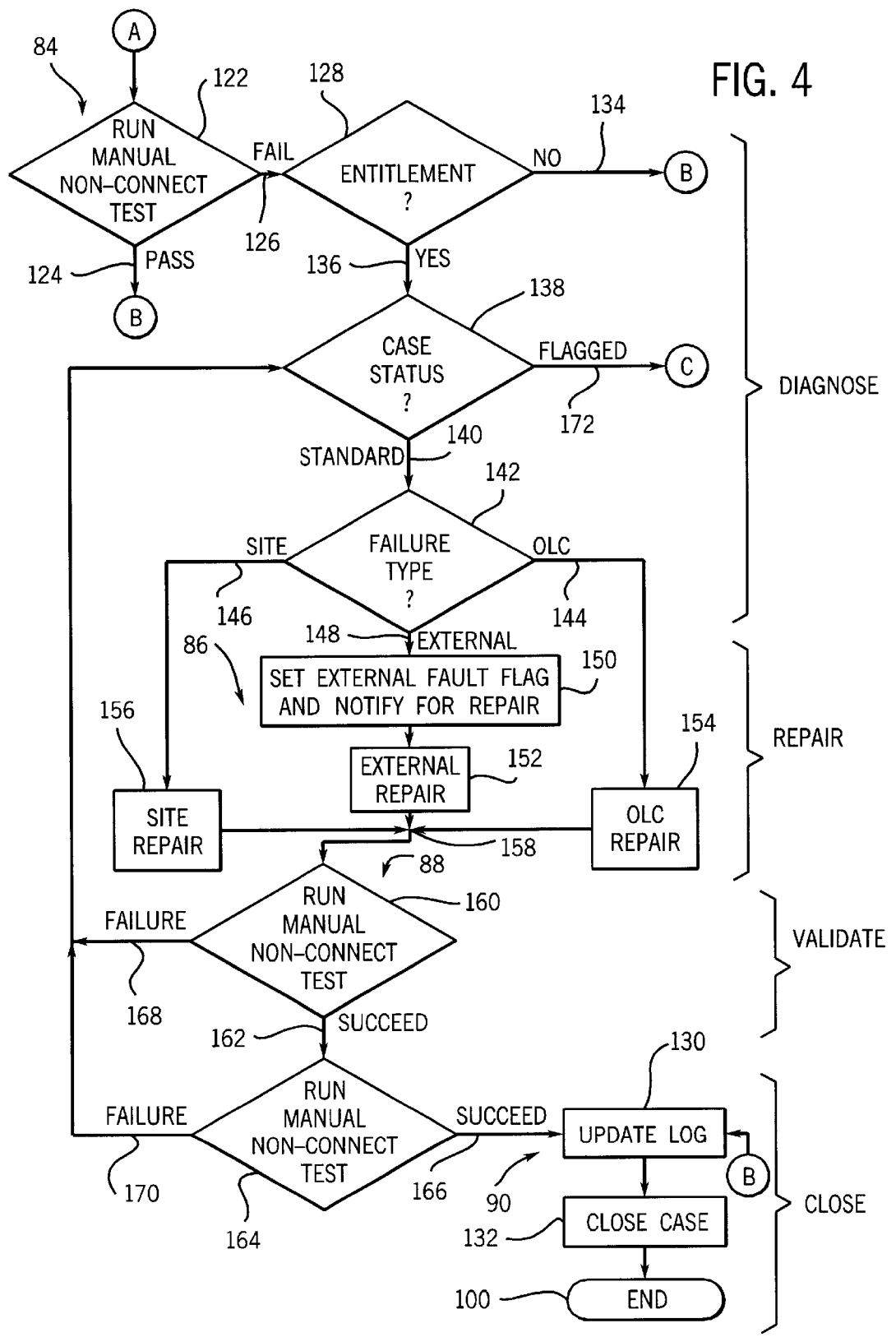

The diagnosis step 84 of FIG. 2 of the present invention is further described in the continuation of the detailed flow chart as shown in FIG. 4. After receiving a connectivity failure notice at the on-line center indicating a communications failure between the on-line center and an in-field product, an on-line engineer manually initiates a software-based non-connect test 122 to confirm a communications failure between the on-line center and the in-field product. The details of the software-based non-connect test will be described hereinafter with reference to FIG. 7. If the non-connect test does not indicate any communications failure 124, a second manual non-connect test (not shown) is performed to validate the results. If both succeed, a database is updated at 130 so that the history of all connectivity failure notifications can be logged and reviewed for diagnosing intermittent problems. The case is then closed at 132 and the system ends the diagnosis routine at 100.

On the other hand, if the non-connect test 122 confirms a connectivity failure 126, the system checks a database as to whether the in-field product or customer is entitled to communications connectivity failure diagnosis at 128. If it is not 134, the log is updated at 130 to indicate that the report was received and the case is closed at 132, concluding the diagnosis process at 100. It is contemplated that logging such information can be used to notify the customer of the connectivity failure report and seek entitlement authorization for further diagnosis. Such notification can be provided by a personal telephone call, an automated voice mail 58, FIG. 1, an automated pager 60, or an automated email 62, all originating from the on-line center 16. The entitlement can include a service or warranty package. The database check for entitlement at step 128, FIG. 4, would ensure that a particular customer has signed up for the communications connectivity failure diagnosis, and can also include an automated check to make sure an executed contract is on file.

Once the system ensures that a user is entitled to communications connectivity diagnosis 128, 136, the status of a computerized database case is checked at 138. If the case has not been flagged 140, the type of failure is determined at 142 by isolating the communications failure and identifying the failure type as either an on-line center communications failure 144, a subscribing station communications failure 146, or an external communications failure 148. To initiate the repair 86 of an external communications failure, an external fault flag is set at 150 to notify an appropriate repair service and the external repair is made at 152. If the failure is isolated as either an on-line center communications failure 144, or a subscribing station communications failure 146, either an on-line engineer makes the repair at the on-line center 154 or a field engineer makes a repair at the subscribing station site 156 after being so notified.

Once the repairs are complete 158 the validate process 88 can begin. In order to validate that the communications connectivity failure has been successfully repaired, the manual non-connect test is called at 160, and if successful 162, it is called once again at 164 for redundant confirmation. If the non-connect test succeeds both times 166, the log is updated at 130 and the case is closed at 132, thereby ending the failure diagnosis process 100. However, if either non-connect test fails 160, 168 or 164, 170, the process goes back to check the status of the case at 138 and continues standard diagnosis 140 unless the case is flagged at 172.

Figure 5:
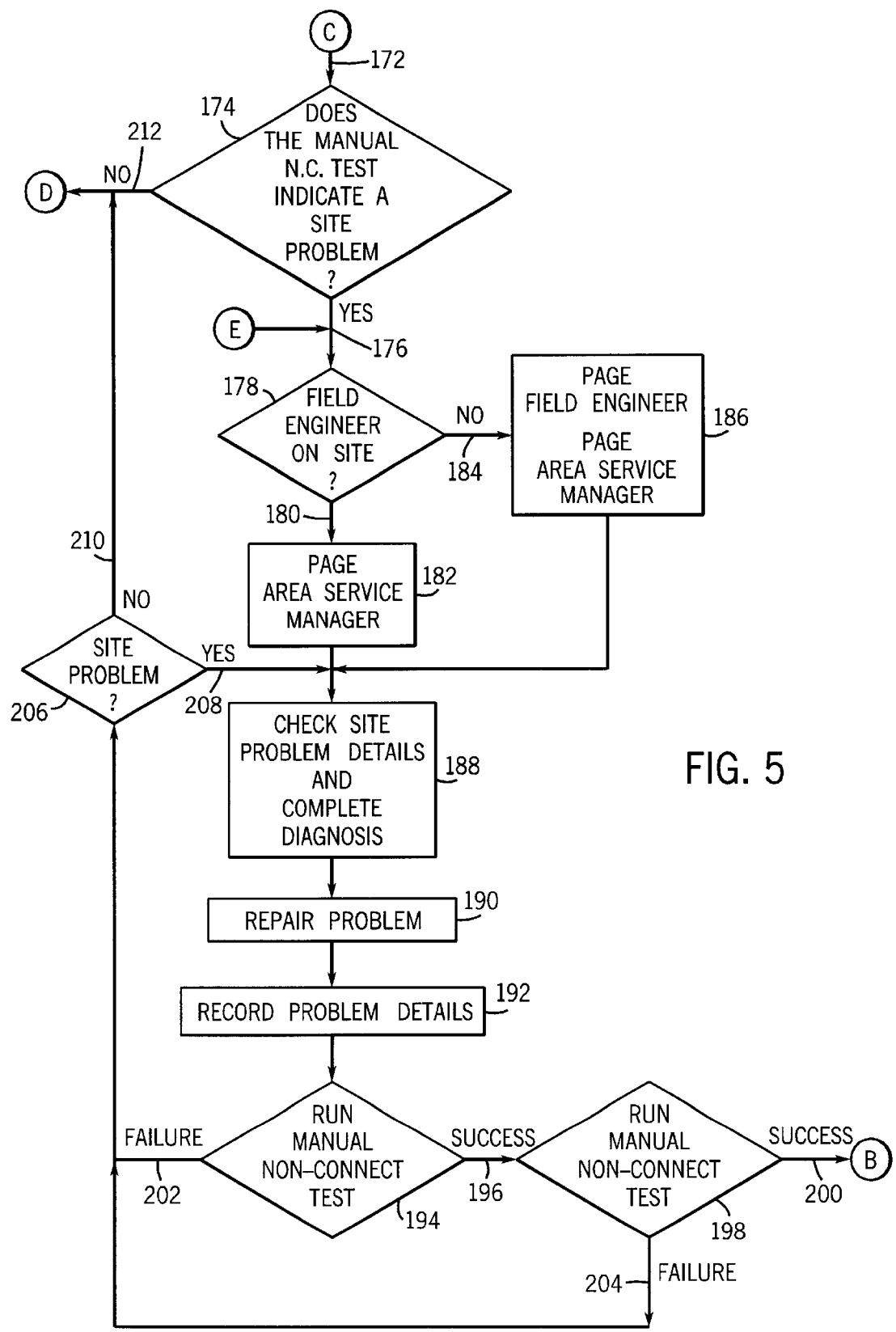
FIGS. 5 and 6 each show a flow chart of an extension of the process shown in FIG. 4 depicting an extraordinary escalation process used when a case is flagged from standard diagnosis.

One particular criteria for flagging a case at 138, 172 would be the particular age of the case. For example, if the case has been pending for more than some predetermined period of time, the case is flagged for escalated service through 172, which will now be described with reference to FIG. 5. The first step in escalating diagnostic service is to check whether the manual non-connect test indicates a site problem 174, and if it does 176, the present invention checks whether a field engineer is on-site at the subscribing station 178. If the field engineer is working on the problem on-site 178, 180, an area service manager is paged at 182 to notify the area service manager that escalated service is required. If the field engineer is not on-site 178, 184, both the field engineer and the area service manager are paged 186. Each is notified that escalated service is required, but usually the area service manager is only notified that the case has been escalated thereby requiring follow up with the field engineer, whereas the field engineer is paged to go to the subscribing station site to complete the diagnostics 188. Once the problem has been located and repaired 190, the details of the site fault are recorded 192 and the manual non-connect test is called at 194, and if successful 196, it is called again at 198 to ensure proper communications connectivity 200. The successful diagnosis and repair is then logged at 130, FIG. 4, the case is closed 132, and the process is finished 100.

Referring back to FIG. 5, if the manual non-connect test subroutine fails at either of the redundant confirmations 202, 204 the system ensures that the problem is a site problem 206, 208 and the diagnosis continues at 188. However, if the communications fault is found to be not at a subscribing station site 206, 210, or if after the initial escalation 172 it was determined that the manual non-connect test indicated a fault at the on-line center 174, 212, then escalation is performed at the on-line center 214, FIG. 6.

Figure 6:
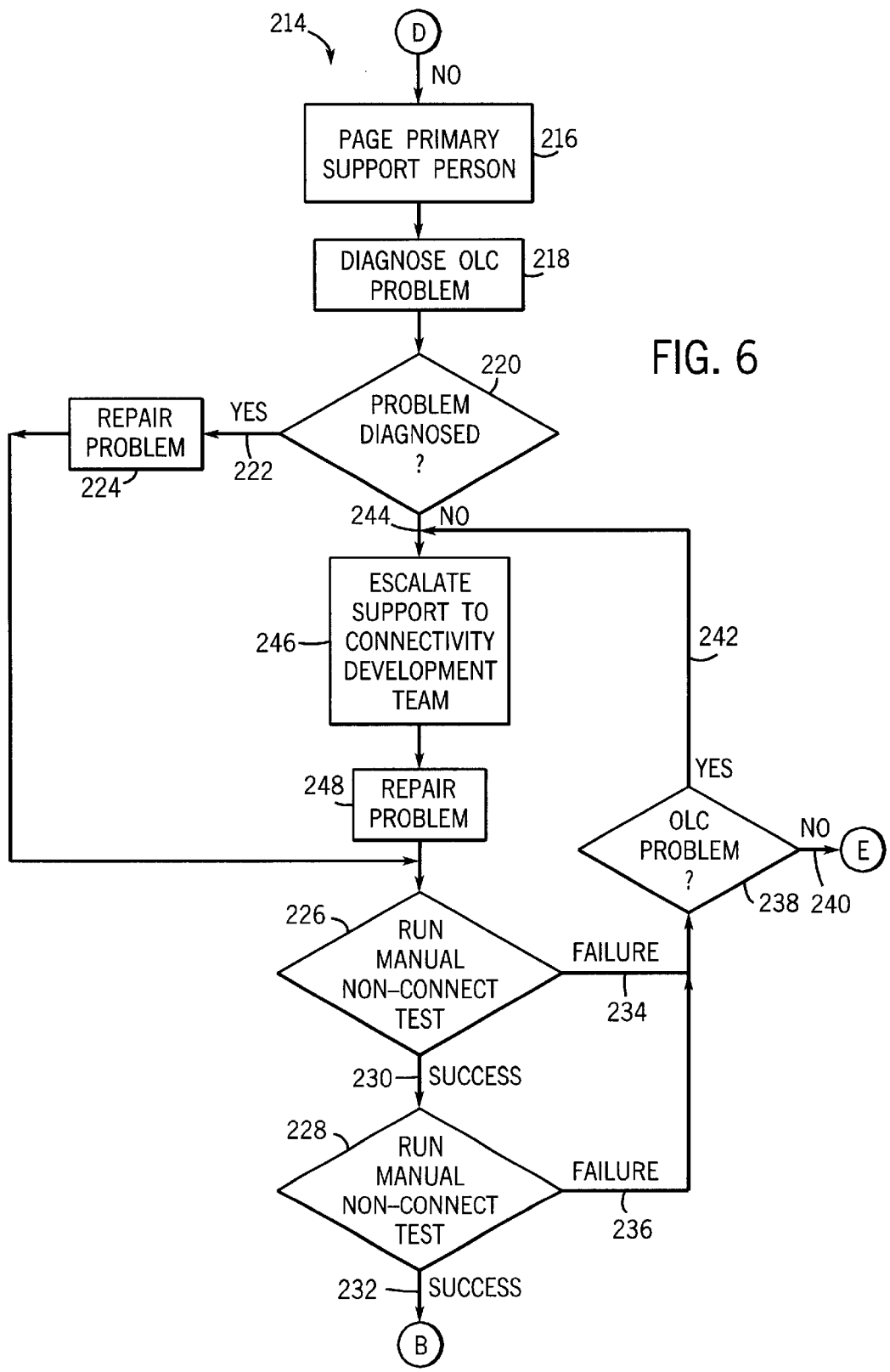

As shown in FIG. 6, once it is determined that the case must be escalated for diagnosis at the on-line center 214, a primary support personnel is paged at 216 to diagnose the on-line center communications fault 218. If the problem is diagnosed 220, 222, the fault is repaired at 224 and the redundant manual non-connect test subroutine is called at 226 and 228. If both are successful 230, 232, the repair has been successfully accomplished and the results are logged at 130, FIG. 4, the case is closed 132 and the diagnostics process is complete at 100. However, if either of FIG. 6 non-connect tests 226, 228 fails 234, 236, the process ensures that the problem lies in the on-line center 238. If the communications fault does not lie in the on-line center 240, service will be escalated at the subscribing station site 176, FIG. 5. It is contemplated that the decision at 238 of FIG. 6 could also include a tri-state check to ensure that the problem is not in the external communications system. If it were found at fault, the system could then set the external fault flag at 150, FIG. 4, to notify for repair of the external system at 152.

If the problem is determined to still be within the on-line center 238, 242 of FIG. 6, or if the fault was not diagnosed by the primary support person 220, 244, the case is again escalated, but now to a specialized connectivity development team 246 wherein the case is escalated to a primary status until the fault is diagnosed and the problem repaired at 248. Once the fault is repaired, the redundant manual non-connect test is run 226, 228 until successful at 232, at which time the results are logged 130, FIG. 4, the case is closed 132, and the communications connectivity failure diagnosis is then complete at 100.

Figure 7:
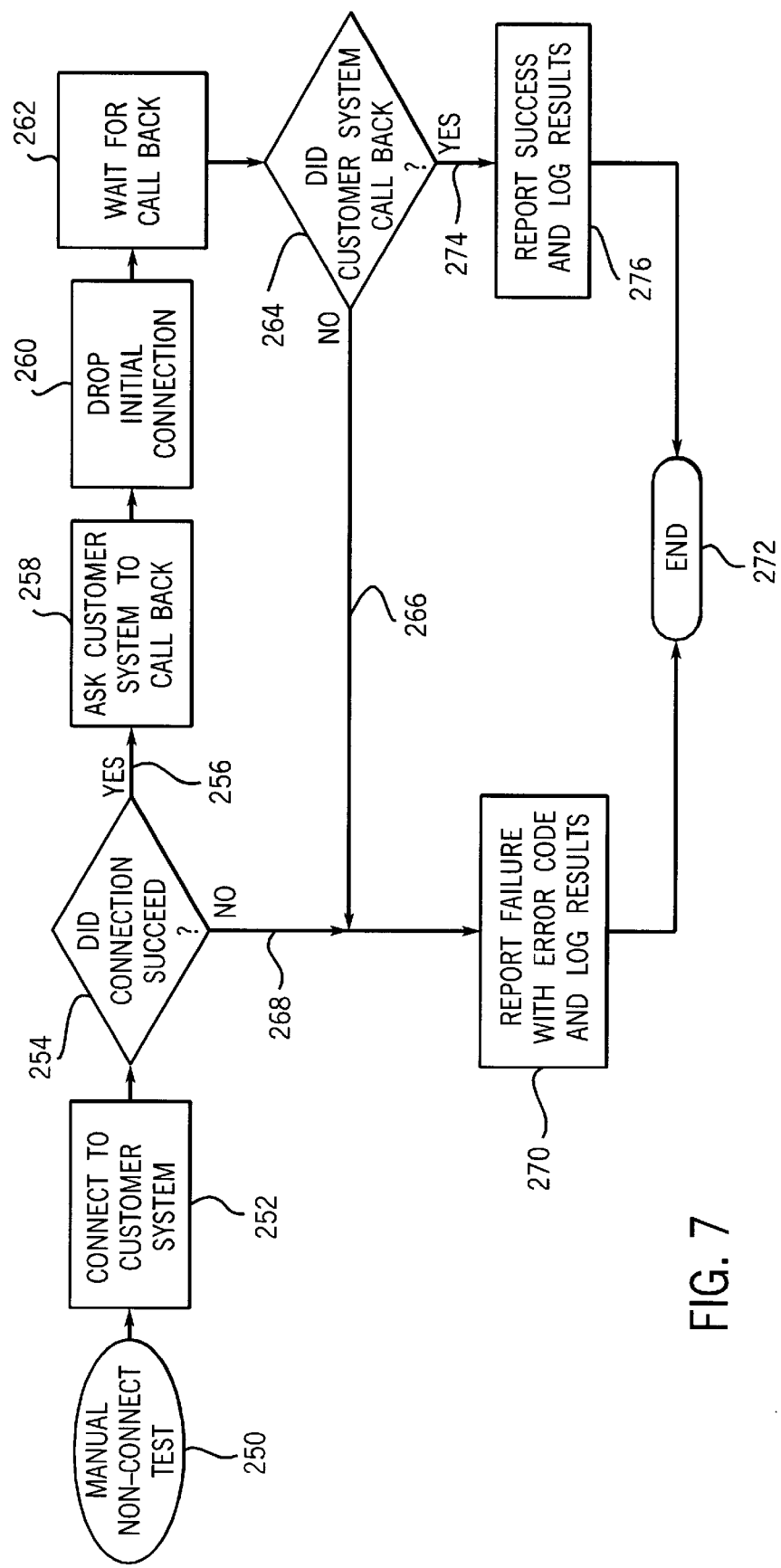
FIG. 7 is a detailed flow chart of the manual non-connect test used in FIGS. 3–6.

Referring now to FIG. 7, the manual non-connect test subroutine will be described. Upon being called, or initiated, 250, the on-line center attempts to connect to the customer's subscribing station 252, and if the connection is successful 254, 256, the subscribing station is instructed to call the on-line center back at 258. The first connection is then disconnected at 260 and the on-line center awaits the return call from the subscribing station 262. If either the subscribing-station did not call back 264, 266, or the first connection was not successful 254, 268, the communications connectivity failure is confirmed at 270 and an error code is assigned to identify and isolate where the communications failure exists. The results are then logged and the manual non-connect test subroutine is complete at 272 and returns control to the main algorithm. If both the first and the second connections are successful 254, 256, and 264, 274, the successful connections are reported and logged at 276 and the subroutine is complete at 272.

Accordingly, the present invention includes a method of communications connectivity failure diagnosis including the steps of receiving a connectivity failure notice at an on-line center indicating a communications failure between the on-line center and an in-field product at a subscribing station, and then manually initiating a software-based non-connect test to confirm a communications failure between the on-line center and the in-field product. The method next includes diagnosing the communications failure by isolating the failure and identifying a failure type, then reporting the communications failure for repair. The step of manually initiating a software-based non-connect test includes connecting the on-line center to the in-field product and confirming whether the connection was successful, and if so, automatically instructing the in-field product to initiate and complete another connection from the in-field product to the on-line center. A failure is reported if either connection is not successful and the results are logged in a computerized database.

A database is checked to determine whether the in-field product is entitled to communications connectivity failure diagnosis to ensure an owner of the in-field product has entered into a service contract for such diagnosis service. If so entitled, a computerized database case is created and placed in a queue for retrieval by an on-line engineer. The status of the case is checked to ensure that special care is not required. If special care is required, the case is escalated to a further level of support. The further level of support can include sending an electronic page to service personnel to escalate the diagnosis, such as in cases where the reported case has not been resolved for some predetermined period of time. In diagnosing the communications failure, the present invention differentiates between on-line center communications failures, subscribing station communications failures, and external communications failures. Once repaired, the present invention redundantly confirms communications connectivity and logs the results to ensure proper connectivity.

The present invention also includes a communications connectivity failure diagnosis system that includes at least one subscribing station having at least one in-field product associated therewith and at least one computer programmed to control the in-field product. The system includes an on-line center capable of receiving a connectivity failure notice, which can be either a computerized automatic notice, or a non-computerized notice, each indicating a communications failure between the on-line center and the subscribing station. The on-line center creates a database case in response thereto. The system includes a communications network to relay data from the on-line center to the subscribing station and includes a communication portion in the on-line center and a communication portion in the subscribing station. The communications network also includes an ability to connect the on-line center to the subscribing station through an external communications network, such as the Internet or public telephone system. However, the communications network does not necessarily include the external communications network within the scope of the invention. For example, the invention does not include a public telephone system, but does include an ability to connect to it, isolate a problem to it, and request repair thereof.

When a service personnel at the on-line center initiates an interactive non-connect test in response to receiving a connectivity failure notice, the on-line center can automatically isolate the communications failure to at least one of the on-line center, the subscribing station, and/or the external communications network. The system includes a computer within the on-line center programmed to receive the connectivity failure notice by either the computerized automatic connectivity failure notice or a non-computerized connectivity failure notice as the indication of the communications failure and to perform the interactive non-connect test to validate the communications failure. The computer is also programmed to receive a user input to initiate the performance of the interactive non-connect test and further allow the user to monitor the interactive non-connect test and modify the interactive non-connect test as needed by the on-line center engineer.

The computer is further programmed to ensure that the status of the communications failure diagnosis does not become non-standard, for example, past due. The computer can be programmed to set a flag if the communications failure does become past due, as determined by some predetermined period of time of standard service diagnosis. The flag is then used to escalate service diagnosis to a escalated service level. The computer of the system also includes a process of checking a database to verify that the subscribing station is entitled to communications connectivity failure diagnosis, and only performs that diagnosis for such entitled subscribing stations.

The aforementioned interactive non-connect test performed by the on-line center computer attempts a first connection between the on-line center and the subscribing station, and if successful, after a disconnection, causes a subscribing station to make a second connection from the subscribing station to the on-line center. If either the first or second connections are unsuccessful, the communications failure is confirmed and reported to initiate a repair after isolating the communications failure.

The invention also includes a computer program stored on a computer-readable storage medium in the on-line center computer which, when executed by one or more computers, will cause the one or more computers to create and queue a reported case for communications connectivity diagnosis. The computer is also caused to receive input to initiate a non-connect test and execute the non-connect test to validate a communications failure. The non-connect test causes communications connectivity between the on-line center and the subscribing station in validating whether communications connectivity is successful. If it is not, the computer is caused to ensure that a user of the system is entitled to communications connectivity diagnosis, and if so, the communications failure is isolated and reported for repair. The non-connect test is executed after receiving input that the repair has been complete to ensure proper communications connectivity. If communications connectivity is successful, the results are logged to complete the communications connectivity diagnosis. The computer program further causes the computer to perform and complete the aforementioned steps of the method and the acts set forth with respect to the system.

The present invention has been described in terms of the preferred embodiment, and it is recognized that equivalents, alternatives, and modifications, aside from those expressly stated, are possible and within the scope of the appending claims.

What is claimed is:

1. A method of communications connectivity failure diagnosis comprising the steps of:
    receiving a connectivity failure notice at an on-line center indicating a communications failure between the on-line center and an in-field product;
    manually initiating a software-based non-connect test to confirm a communications failure between the on-line center and the in-field product by connecting the on-line center to the in-field product and confirming whether the connection was successful, and if so, automatically instructing the in-field product to initiate and complete another connection from the in-field product to the on-line center;
    diagnosing the communications failure by isolating the communications failure and identifying a failure type; and
    reporting the communications failure for repair.

2. The method of claim 1 further comprising the step of reporting a failure if either connection is not successful and logging the failure in a computerized database.

3. The method of claim 1 further comprising the step of checking a computerized database as to whether the in-field product is entitled to communications connectivity failure diagnosis.

4. The method of claim 3 wherein the step of automatically checking is further defined as electronically checking the computerized database to ensure an owner of the in-field product entered into a service contract for the communications connectivity failure diagnosis.

5. The method of claim 1 further comprising the step of creating a computerized database case and placing the computerized database case in a computer queue for retrieval by an on-line engineer.

6. The method of claim 5 further comprising the step of checking a status of the computerized database case, and if the status is not normal, then escalating the communications connectivity failure diagnosis to a further level of support.

7. The method of claim 6 wherein the step of escalating further comprising the step of sending an electronic page to service personnel to escalate service diagnosis.

8. The method of claim 1 wherein the step of isolating the communications failure is further defined as differentiating between an on-line center communications failure, a subscribing station communications failure, and an external communications failure.

9. The method of claim 1 further comprising the step of redundantly confirming communications connectivity and logging results of the communications connectivity failure diagnosis.

10. A communications connectivity failure diagnosis system comprising:
    a subscribing station having at least one in-field product and at least one computer programed to control the in-field product;
    an on-line center capable of receiving a connectivity failure notice indicative of a communications failure between the on-line center and the subscribing station and to create a database case in response thereto;
    a communications network to relay data from the on-line center to the subscribing station, the communications network including a communications portion in the on-line center and a communications portion in the subscribing station, and further includes an ability to connect the on-line center to the subscribing station through an external communications network;
    wherein a service person at the on-line center initiates an interactive non-connect test in response to the on-line center receiving a connectivity failure notice, and based on a result of the non-connect test, the on-line center automatically isolates the communications failure to at least one of the online center, the subscribing station, and the external communications network.

11. The system of claim 10 further comprising a computer within the on-line center programmed to:
    receive the connectivity failure notice by one of a computerized automatic connectivity failure notice and a non-computerized connectivity failure notice as the indication of the communications failure; and
    perform the interactive non-connect test to validate the communications failure.

12. The system of claim 11 wherein the computer is further programmed to receive a user input to initiate the performance of the interactive non-connect test and further allow the user to monitor the interactive non-connect test and modify the interactive non-connect test on an as needed basis.

13. The system of claim 11 wherein the computer is further programmed to ensure that a status of the communications failure does not become past due.

14. The system of claim 13 wherein the computer is further programmed to lag a communications failure after a predetermined period of standard service diagnosis for escalated service diagnosis to accomplish such ensurance.

15. The system of claim 11 wherein the computer is further programmed to check a database to verify that the subscribing station is entitled to communications connectivity failure diagnosis, and only perform failure diagnosis for entitled subscribing stations.

16. The system of claim 11 wherein the interactive non-connect test performed by the on-line center computer attempts a first connection between the on-line center and the subscribing station, and if successful, and after a disconnection, causes the subscribing station to make a second connection from the subscribing station to the on-line center.

17. The system of claim 16 wherein the computer is further programmed to report a communications failure if either the first or second connections are unsuccessful, and to report a communications success if both the first and second connections are successful.

18. The system of claim 11 wherein the computer is further programmed to report the communications failure to initiate repair of the isolated communications failure.

19. A computer-readable storage medium having stored thereon a computer program which, when executed by one or more computers, will cause the one or more computers to:
   create and queue a reported case for communications connectivity diagnosis;
   receive input to initiate a non-connect test;
   execute the non-connect test to validate a communications failure, the non-connect test comprising initiating communications connectivity and validating whether communications connectivity is successful, and if not:
     isolate the communications failure;
     report the isolated communications failure for repair;
     execute the non-connect test after receiving input that repair has been complete to ensure proper communications connectivity;
     if communications connectivity is successful, log results to complete communications connectivity; and
     ensure that a status of the communications failure does not become past due.

20. The computer-readable storage medium of claim 19 wherein the computer program further causes the one or more computers to:
   receive the connectivity failure notice by one of a computerized automatic connectivity failure notice and a non-computerized connectivity failure notice as the indication of the communications failure.

21. The computer-readable storage medium of claim 19 wherein the computer program further causes the one or more computers to:
   receive a user input to initiate the performance of the interactive non-connect test and further allow the user to monitor the interactive non-connect test and modify the interactive non-connect test on an as needed basis.

22. The computer-readable storage medium of claim 19 wherein the computer program further causes the one or more computers to:
   flag a communications failure after a predetermined period of standard service diagnosis for escalated service diagnosis to accomplish such ensurance.

23. The computer-readable storage medium of claim 19 wherein the computer program further causes the one or more computers to:
   check a database to verify that a subscribing station is entitled to communications connectivity failure diagnosis, and only perform failure diagnosis for entitled subscribing stations.

24. The computer-readable storage medium of claim 19 wherein the computer program further causes the one or more computers to:
   attempt a first connection between an on-line center and a subscribing station, and if successful, and after a disconnection, causes the subscribing station to make a second connection from the subscribing station to the online center; and
   report a communications failure if either the first or second connections are unsuccessful, and to report a communications success if both the first and second connections are successful.

25. A computer-readable storage medium having stored thereon a computer program which, when executed by one or more computers, will cause the one or more computers to:
   create and queue a reported case for communications connectivity diagnosis;
   receive input to initiate a non-connect test;
   execute the non-connect test to validate a communications failure, the non-connect test comprising causing communications connectivity and validating whether communications connectivity is successful, and if not:
     isolate the communications failure;
     report the isolated communications failure for repair;
     execute the non-connect test after receiving input that repair has been complete to ensure proper communications connectivity;
     if communications connectivity is successful, log results to complete communications connectivity;
   attempt a first connection between an on-line center and a subscribing station, and if successful, and after a disconnection, cause the subscribing station to make a second connection from the subscribing station to the on-line center; and
   report a communications failure if either the first or second connections are unsuccessful, and to report a communications success if both the first and second connections are successful.

* * * * *

UNITED STATES PATENT AND TRADEMARK OFFICE
CERTIFICATE OF CORRECTION

PATENT NO. : 6,665,820 B1
DATED : December 16, 2003
INVENTOR(S) : Frowein et al.

It is certified that error appears in the above-identified patent and that said Letters Patent is hereby corrected as shown below:

<u>Column 12,</u>
Line 63, delete "lag" and substitute therefor -- flag --.

Signed and Sealed this

Third Day of February, 2004

JON W. DUDAS
*Acting Director of the United States Patent and Trademark Office*